United States Patent [19]

Kerzner

[11] Patent Number: 5,535,703
[45] Date of Patent: Jul. 16, 1996

[54] ANIMAL AMUSEMENT DEVICE

[76] Inventor: Mark I. Kerzner, 3859 E. Lincoln Dr., Paradise Valley, Ariz. 85253

[21] Appl. No.: 415,498

[22] Filed: Apr. 3, 1995

[51] Int. Cl.⁶ ................................................. A01K 29/00
[52] U.S. Cl. ................................................. 119/707
[58] Field of Search ............................. 119/702, 707;
54/1, 71

[56] References Cited

U.S. PATENT DOCUMENTS

| | | | |
|---|---|---|---|
| 2,296,000 | 8/1941 | Ojalvo | 119/702 X |
| 3,777,712 | 12/1973 | Gardner et al. | |
| 3,810,163 | 5/1974 | Arnold et al. | 340/310 R |
| 3,980,051 | 9/1976 | Fury | |
| 4,180,013 | 12/1979 | Smith | |
| 4,199,921 | 4/1980 | Watkins | 54/71 |
| 4,391,224 | 7/1983 | Adler | 119/707 |
| 4,400,696 | 8/1983 | Klingensmith | 340/573 |
| 4,539,937 | 9/1985 | Workman | |
| 4,568,303 | 2/1986 | Brown | 446/242 |
| 4,585,358 | 4/1986 | Shay | 368/262 |
| 4,785,433 | 11/1988 | Bush et al. | 368/109 |
| 4,802,482 | 2/1989 | Gonda et al. | |
| 4,969,418 | 11/1990 | Jones | |
| 5,067,925 | 11/1991 | West | 446/397 |
| 5,351,653 | 10/1994 | Marischen et al. | 119/719 |
| 5,353,744 | 10/1994 | Custer | 119/719 |

*Primary Examiner*—Robert P. Swiatek
*Assistant Examiner*—Yvonne R. Abbott
*Attorney, Agent, or Firm*—Cahill, Sutton & Thomas

[57] ABSTRACT

An animal amusement device is described incorporating a radio receiver triggered by the operation of an animal. The receiver, triggered by operation of the animal's contact with an animal operated switch, is timed and subsequently turned off. The animal switching means provides a tactile feedback to the animal so that it may sense the act of switching. Switching is accomplished with a momentary contact switch that activates a timer to control the energization of the radio receiver.

8 Claims, 2 Drawing Sheets

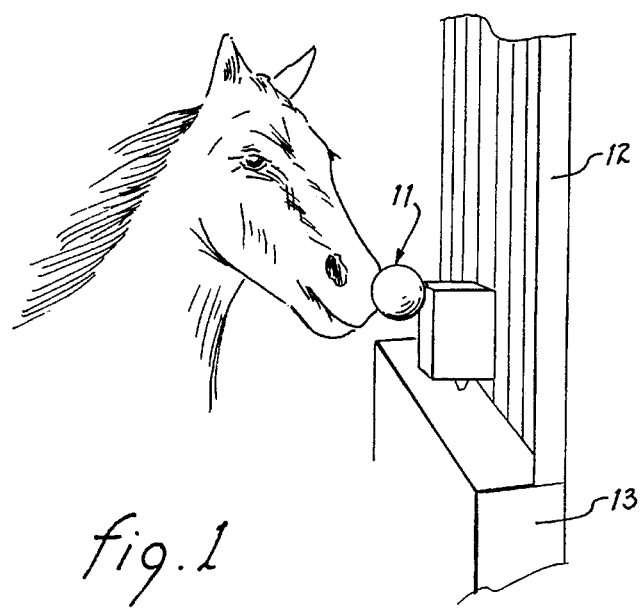
fig. 1
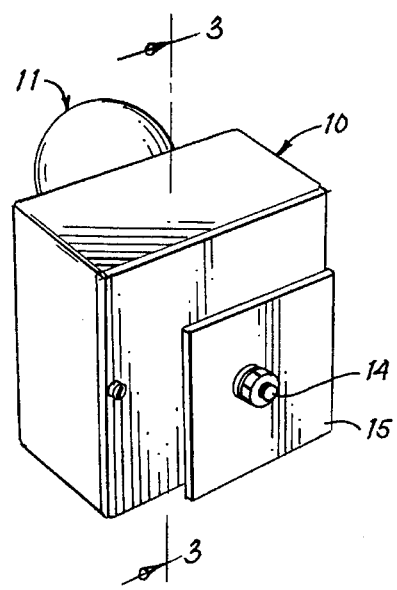
fig. 2
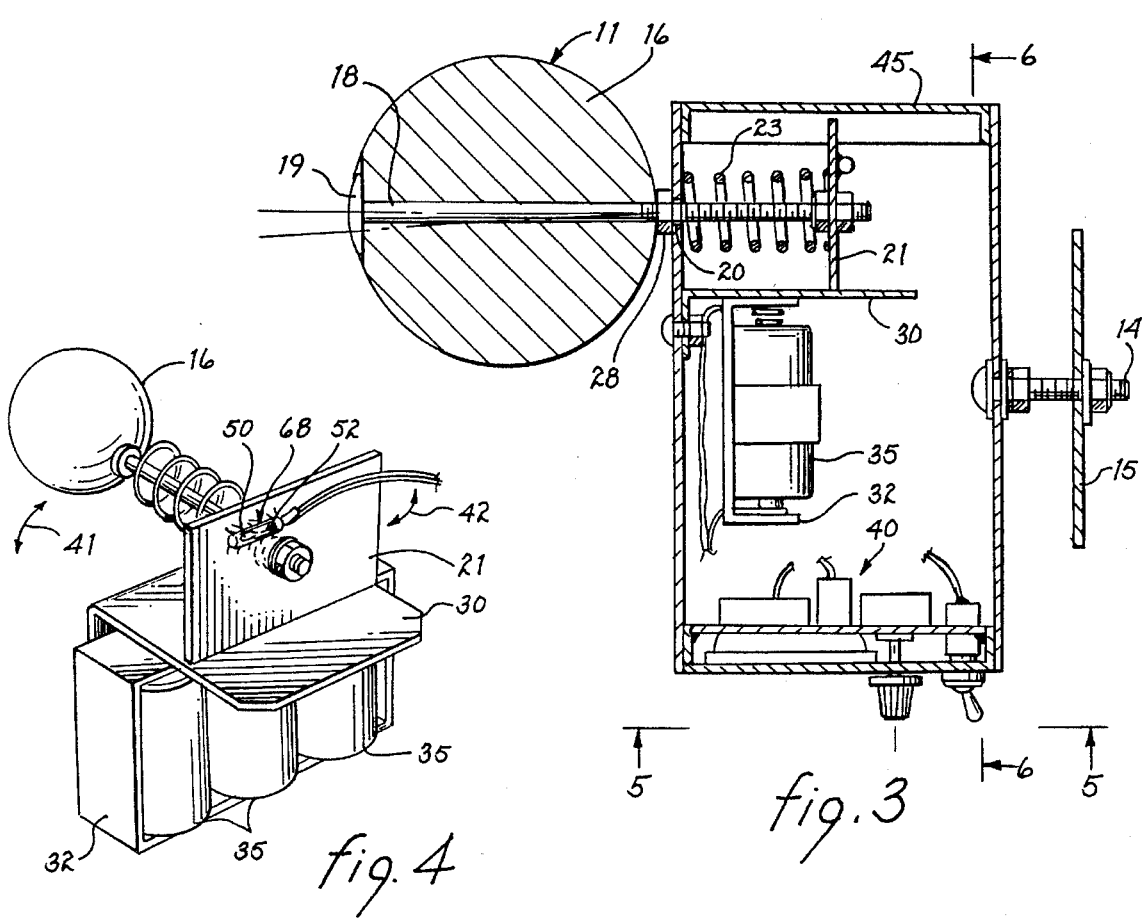
fig. 3
fig. 4

ANIMAL AMUSEMENT DEVICE

The present invention pertains to animal amusement devices that can be activated by animals, and particularly to such devices that provide a sensory feedback to the animal when activated.

BACKGROUND OF THE INVENTION

When animals are confined in relatively small spaces, such as horses being confined to typical horse stalls, the confinement sometimes adversely affects their behavioral patterns. It is common to provide "toys" in such confined areas or stalls to permit the animal to manipulate or play with the toys. Such animal activity frequently has a positive influence on the animal's "attitude".

It has also been found that frequently animals' behavioral patterns are favorably influenced by auditory signals such as music. For example, subjecting dairy cattle to music was found to have beneficial effects on the animals. However, the prior art has not provided an animal amusement device that permits the animal to interact with such auditory signals in a controlled and reliable manner while providing a rugged and reliable apparatus for achieving such interaction.

SUMMARY OF THE INVENTION

The apparatus of the present invention is a rugged reliable animal amusement device that incorporates an auditory signaling device such as a radio receiver that is switched on by the momentary contact of the animal with an externally provided animal actuation switch. The activation of the switch by the animal closes a momentary electrical contact in the apparatus which in turn activates a timer and turns the radio on. The timer returns the radio receiver to the off condition after a predetermined, but adjustable, time. The animal soon learns, through auditory feedback of the radio receiver, that operation of the switch results in the receipt by the animal of the radio broadcast. The animal operated switch is positioned and formed in a manner to provide a tactile feedback to the animal to facilitate the association of the tactile feel of the switch with the auditory feedback of the radio broadcast.

It is therefore an object of the present invention to provide an animal amusement device to permit interaction of the animal with the device.

It is also an object of the present invention to provide an animal amusement device that provides auditory signals in the form of radio broadcasts that can be triggered by the animal.

It is also an object of the present invention to provide an animal amusement device that provides tactile feedback when triggered by the animal and auditory feedback for a predetermined time thereafter.

It is still another object of the present invention to provide a switchable radio receiver that is rugged and reliable and can be activated by the animal in a safe and convenient manner.

BRIEF DESCRIPTION OF THE DRAWINGS

The present invention may more readily be described by reference to the accompanying drawings in which:

FIG. 1 is a pictorial illustration of the apparatus of the present invention placed in a horse stall environment.

FIG. 2 is a rear three quarter perspective view of the apparatus shown in FIG. 1.

FIG. 3 is a cross-sectional view of the apparatus of FIG. 2 taken along line 3—3.

FIG. 4 is a perspective illustration of a portion of the apparatus of the present invention useful for describing the operation of the apparatus.

DETAILED DESCRIPTION

Figure 6:
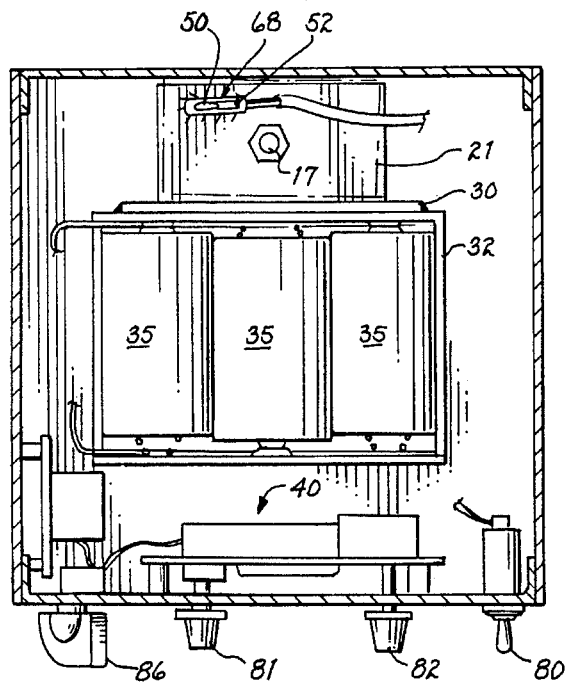
FIG. 6 is a cross-sectional view of the apparatus of the present invention shown in FIG. 3 taken along lines 6—6.

Referring now to FIGS. 1 and 2, the apparatus in the embodiment chosen for illustration is shown as a box or enclosure 10 for housing the various elements of the invention and having an external animal operated switching means 11 extending therefrom. The invention is shown in a horse stall environment wherein conventional stall bars 12 are mounted atop and extend upwardly from a wall 13. The housing 10 is secured to the bars in any convenient manner such as by a mounting bolt 14 extending between adjacent bars 12 and passing through a hole provided in plate 15. The housing 10 may be formed of heavy gauge galvanized steel to withstand possible abuse by the animal; it will be obvious to those skilled in the art that other materials may be used including rigid plastic materials. The apparatus, and particularly the switching means 11 is positioned at a convenient height and location within the enclosure or stall to facilitate contact therewith by the animal.

Referring now to FIG. 3, a cross-section of the apparatus of FIG. 2 is shown. For use of the apparatus in an environment such as horse stalls, the animal operated switching means 11 may take the form of a convention softball 16 having a rugged scuff-proof exterior covering; a switch operating bolt 17 extends through the ball 16 as shown.

The switch operating bolt 17 passes through a diametric channel 18 formed in the ball 16. The head 19 of the bolt may be countersunk as shown to prevent injury to the animal. The switch operating bolt 17 extends from the ball 16, through a hole 20 provided in the housing 10 and is threadedly secured to a sliding plate 21. The hole 20 is larger than the diameter of the switch operating bolt 17 so that the bolt can be moved outwardly of the housing 10 and pivoted about the hole 20 when the ball 16 is contacted by the animal. The ball is held in the position shown by a positioning spring 23 in the form of a helical spring compressed between the front wall 24 of the housing 10 and the sliding plate 21. When the ball 16 is contacted by the animal, the ball is permitted limited pivotal movement but is always returned to the position shown by the positioning spring 23 acting upon the sliding plate 21. The plate 21, under the influence of the positioning spring 23, pulls the switch operating bolt 17 into the housing 10 until the stop nut 28 is brought into abutting contact with the wall 24 of the housing 10.

The sliding plate 21 is perpendicular to and in sliding contact with mounting plate 30. The mounting plate 30 is secured to the front wall 24 and provides a convenient means for securing a battery bracket 32 within housing 10. The battery bracket 32 supports a plurality of suitable batteries 35 acting as a power supply for the radio receiver and timing circuit (shown generally at 40 and to be described more fully hereinafter).

Referring now to FIG. 4, the mounting plate 30, the battery bracket 32 and batteries 35 are shown. The relationship between the mounting plate 30 and the sliding plate 21 may more clearly be seen in FIG. 4; it may be noted that the plate 30 provides a contact surface for the bottom edge of the sliding plate 21. As the ball 16 is contacted by the animal, the ball 16 and the switch operating bolt 17 are pivoted with respect to the front wall 24 of the housing such that the sliding plate 21 is moved but is restrained to a horizontal movement as a result of contact between the sliding plate 21 and the mounting plate 30. The described motion of the ball 16 is shown by the arrow 41 while the corresponding motion of the sliding plate 21 is shown by the arrow 42. It may be noted that this sliding relationship between the sliding plate 21 and mounting plate 30 permits motion of the sliding plate 21 but limits its rest or static position to horizontal; that is, the sliding plate is substantially restrained from moving up or down as a result of contact with the mounting plate or the top wall 45 of the housing 10 (FIG. 3) and is also prevented from rotating about the switching operating bolt 17 because of its contact with the flat mounting plate 30.

The sliding plate 21 is thus prevented from rotating about the switch operating bolt 17 and is permitted motion in only a horizontal direction when the animal operated switch means 11, in the form of a ball 16, is contacted by the animal. A conventional mercury switch 68 may be secured, such as by epoxy cement, to the face of the sliding plate 21. The mercury switch is a conventional momentary contact switch that is readily commercially available. Such mercury switches are typically constructed of a glass vial in which a pool of liquid mercury is captured and which may travel from one end of the vial to the other depending on the orientation of the vial. At one end of the vial, a pair of electrical contacts extend into the interior and can be contacted by the mercury when the latter is positioned at the contact end of the vial. Such mercury switches are well known and need not be described here. However, it is important to note that by mounting the mercury switch on the sliding plate 21, the switch may be oriented at a very slight incline with respect to horizontal such that the mercury pool 50 therein is out of contact with the contacts 52 within the switch. Any sudden motion in a horizontal direction would then propel the mercury pool to the opposite end of the switch vial and briefly complete the electrical circuit between the contacts therein; that is, the switch becomes momentarily closed. Thus, when the ball 16 is contacted by an animal such as a horse, the sliding plate 21 is abruptly moved in a horizontal plane in a direction such as that shown by the arrow 42 in FIG. 4, resulting in the momentary closure of the contacts within the mercury switch 68. The sliding plate 21 will thereafter return to its rest position as shown in FIGS. 3 and 4 as a result of the forces applied by the positioning spring 23. In this rest position, the mercury switch 68 will again be in its open condition. This momentary closure of the mercury switch 68 causes the energization of a radio receiver as will now be described in connection with FIG. 7.

Figure 7:
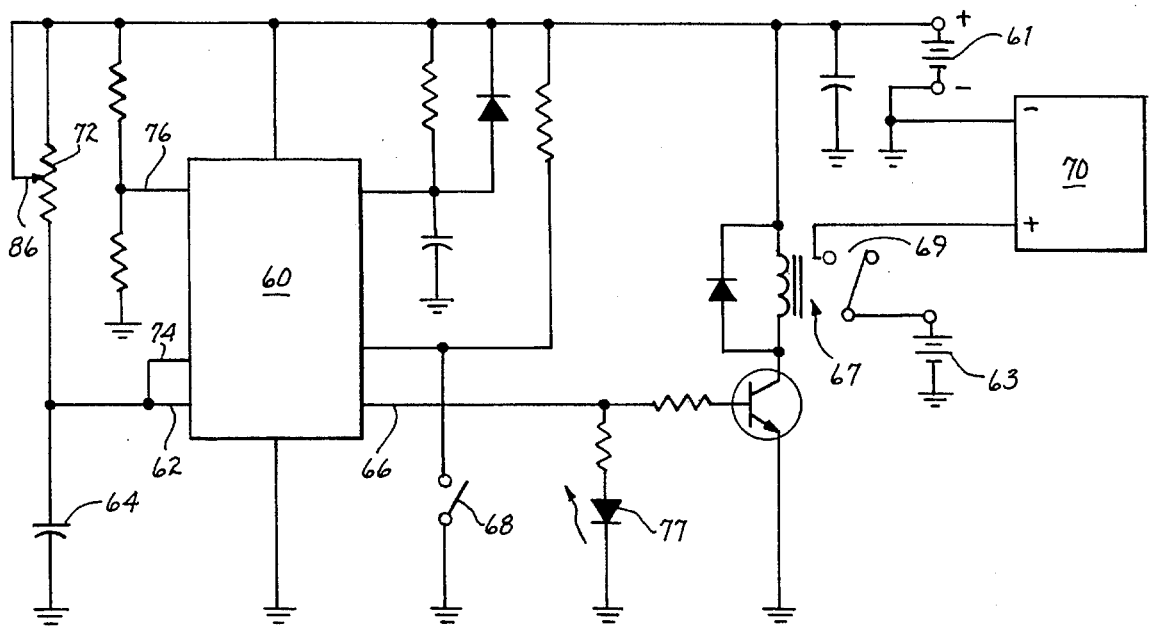
FIG. 7 is a schematic circuit diagram of an electrical circuit suitable for use in the apparatus of the present invention.

Referring to FIG. 7, a schematic circuit diagram is shown of a suitable electrical circuit for use in the system of the present invention. While there are numerous circuits that could be used in the apparatus of the present invention, the one chosen for illustration has been found to be inexpensive and rugged. A commonly commercially available timer 60 may be utilized to perform the necessary signal timing functions in the circuit. The timer is a low energy version of a commonly available eight pin integrated circuit conventionally designated TA7555. The discharge pin 62 of the timer initially keeps capacitor 64 discharged. This causes the output pin 66 of the integrated circuit 60 to stay at zero volts, keeping the relay 67 off and the switch contacts 69 open. When the switch 68 is momentarily closed, the output pin 66 of the integrated circuit 60 "goes high" and the relay 67 is energized, thus closing the contacts 69 and applying the voltage of the power supply 63 to the radio receiver 70. At the same time, the grounding by the discharge pin 62 stops, and the capacitor 64 begins charging slowly through variable resistor 72. The threshold pin 74 of the timer 60 monitors the voltage on the capacitor 64 as it slowly rises. When the voltage across the capacitor exceeds the voltage at the control pin 76, the discharge pin 62 grounds the capacitor 64, discharging the voltage on the capacitor. The output pin 66 then goes to zero volts at the same time, thus de-energizing the relay 67, opening the contacts 69, and shutting off the radio receiver 70. In the diagram of FIG. 7 the voltage supplied to the system is shown as two voltage supplies 61 and 63; these two voltage supplies are shown only for convenience. It will be obvious to those skilled in the art that a single supply would normally be used for the system. A light emitting diode 77 may be provided for convenience to indicate to the operator when the radio is on. This latter information may be useful in the event the radio is on but is not tuned to a station or the volume is very low. The diode will be on when the output pin 66 "goes high"; that is, when the voltage on the output pin 66 energizes the relay 67 to close the contact 69 and turn the radio receiver 70 on. While the preferred embodiment incorporates a radio as the source of auditory signals any audio signal source would be appropriate including tape or disc recordings. Tone generators, or pre-recorded messages by the owner or trainer, or a variety of sounds such as vocalizations by other animals may be used as the auditory signals although music appears to be the preferred signal.

Figure 5:
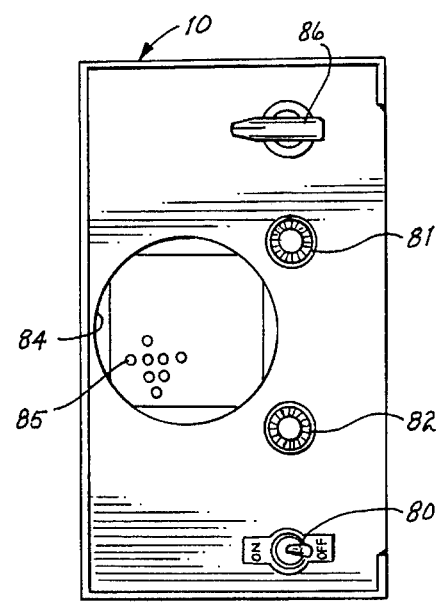
FIG. 5 is a bottom view of the apparatus shown in FIG. 3 taken along line 5—5.

Referring to FIGS. 5 and 6, a typical arrangement of the elements of the apparatus of the present invention may be seen. It will be understood by those skilled in the art that other arrangements could be used without departing from the spirit and scope of the invention. In FIG. 5, the bottom of the housing 10 is shown wherein it may be seen that various controls are positioned in a manner to be inaccessible to the animal but to be conveniently manipulated by an owner or operator. A conventional on/off switch 80 permits the entire system to be turned off rendering the functions of the animal operated switching means inoperable. By turning the switch 80 on, the system is "armed" and ready for actuation by the animal. A conventional radio receiver may be used including a station selection or frequency selection knob 81 and a volume control 82. An opening 84 is provided so that an auditory transducer or speaker 85 may be mounted adjacent thereto and transmit auditory signals therefrom. A timer control knob 86 is provided to permit the operator to adjust the length of time that the radio receiver remains on after having been triggered by the animal. The timer control knob 86 may be seen in the schematic diagram of FIG. 7 as the adjustable contact with the variable resistance 72. It may be noted by particular reference to FIG. 6 that the mercury switch 68 is mounted on the sliding plate 21 at a slightly inclined angle to horizontal such that the mercury pool therein normally resides at the end of the vial away from the electrical contacts therein.

It will be obvious to those skilled in the art that many modifications may be made in the embodiments of the present invention shown herein without departing from the spirit and scope of the invention. For example, a great variety of electrical circuits may be used to accomplish the function implemented in the described embodiment; similarly, the size, shape and arrangement of components within the housing may take a great variety of forms as well as the animal operated switching means. For animals that are not as large as an equine, the system could obviously be tailored in a much more compact manner while nevertheless providing the necessary ruggedness and reliability. It has been found that the radio receiver may be a very inexpensive modular design incorporating a simple AM broadcast receiving circuit; the sensitivity of such circuits appear to be more than adequate although a more refined (and expensive) receiver systems could be incorporated.

What is claimed is:

1. An animal amusement device comprising:
   (a) an enclosure;
   (b) a switch actuating means extending from said enclosure and positioned to be contacted by an animal to thereby provide tactile feedback to the animal;
   (c) an electrical contact switch mounted in said enclosure responsive to said actuating means for closing electrical contacts upon contact by the animal with said actuating means;
   (d) an electrically powered auditory signal source for generating auditory signals and transmitting said auditory signals to said animal;
   (e) an electrical power supply; and
   (f) electrical timing means connected to said contact switch responsive to the closing of said electrical contacts for electrically connecting said auditory signal source to said power supply for a predetermined time.

2. The combination set forth in claim 1 wherein said electrical contact switch is a momentary contact switch.

3. The combination set forth in claim 1 wherein said electrical contact switch is a mercury switch.

4. The combination set forth in claim 3 including mounting means for mounting said mercury switch in a normally open contacts position, said mounting means secured to said switch actuating means, whereby contact with the actuating means by an animal causes motion of said mounting means and the momentary closure of the mercury switch.

5. The combination set forth in claim 4 wherein the mounting means is a sliding plate secured to the actuating switch and maintained in a predetermined orientation with respect to horizontal by sliding contact along an edge thereof with a mounting plate.

6. The combination set forth in claim 5 wherein the sliding plate is maintained in a vertical orientation and the mounting plate is horizontal.

7. The combination set forth in claim 1 wherein said electrically powered auditory signal source is a radio receiver.

8. The combination set forth in claim 1 wherein said electrically powered auditory signal source is a device for playing prerecorded auditory signals.

* * * * *